Figure 1:
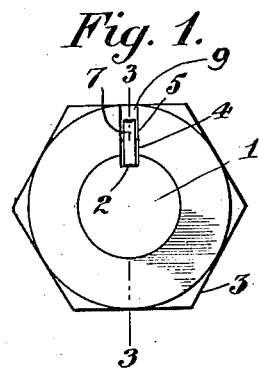

W. V. TABER.
NUT LOCK.
APPLICATION FILED APR. 4, 1917.

1,261,646.

Patented Apr. 2, 1918.

Witness
F. Windridge.

Inventor
W. V. Taber
By Victor J. Evans
Attorney

UNITED STATES PATENT OFFICE.

WILLIAM V. TABER, OF NOT, MISSOURI.

NUT-LOCK.

1,261,646.     Specification of Letters Patent.     Patented Apr. 2, 1918.

Application filed April 4, 1917. Serial No. 159,698.

*To all whom it may concern:*

Be it known that I, WILLIAM V. TABER, a citizen of the United States, residing at Not, in the county of Oregon and State of Missouri, have invented new and useful Improvements in Nut-Locks, of which the following is a specification.

This invention relates to improvements in means for locking a nut upon a bolt, and the object of the invention is to produce a spring locking member associated with a nut adapted to be received in the groove of the bolt upon which the nut is threaded but which may be easily and quickly removed from the said groove and latched upon the nut to permit of the screwing or the unscrewing of the nut upon the bolt.

With the above and other objects in view the improvement resides in the construction, combination and arrangement of parts set forth in the following specification and falling within the scope of the appended claim.

Figure 2:
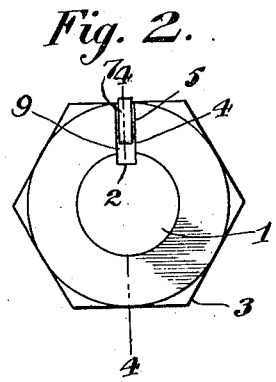
Figure 3:
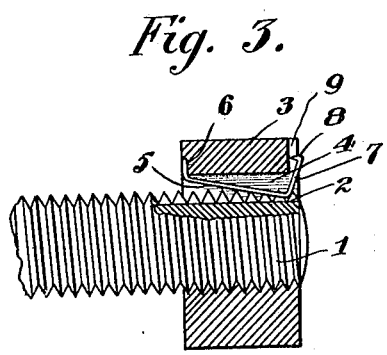
Figure 4:
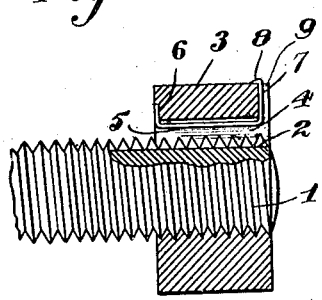

In the drawing:

Figure 1 is an end view of a nut and bolt locked in accordance with the present invention, Fig. 2 is a similar view showing the locking member latched upon the nut to permit of the turning of the nut and bolt, Fig. 3 is a sectional view approximately on the line 3—3 of Fig. 1, and Fig. 4 is a similar sectional view on the line 4—4 of Fig. 2.

In the drawing, the numeral 1 designates a bolt which has its threaded shank from its outer end provided with one or more longitudinally extending grooves 2. The numeral 3 designates a nut which is adapted to be screwed upon the bolt 1. The nut is of the ordinary construction but has its threaded bore provided with a longitudinally arranged groove or channel 4. Adapted to be arranged within the groove or channel 4 is the locking member 5. The locking member comprises a strip of spring material of a width slightly less than the width of the groove and of a thickness materially less than the depth of the groove. The locking member has what I will term its inner end received in a transverse depression 6 upon the inner face of the nut and is secured within this depression in any desired or preferred manner so that the locking member provides an element of the nut. The opposite or outer end of the locking member is formed with an angular extension 7 which is received in a transverse depression 9 in the outer face of the nut and the said extension 7 has its end formed with an inturned lip 8 that is adapted to engage with the outer face of the nut when the locking member is to be latched within the depression or groove 6 to permit of the nut being screwed upon the bolt.

It is to be noted that the locking member is connected at only one of its ends with the nut so that when the lip 8 is brought out of engagement with the side of the nut, the locking member will spring inwardly of the groove so that its end opposite its extension 7 will be projected to within the bore of the nut and will be received in one of the grooves 2 of the bolt 1, whereby to lock the nut upon the bolt. By the employment of a suitable pointed instrument inserted in the groove and brought to bear against the inwardly projecting end of the locking member the same may be thus forced to within the depression and out of the groove 2 of the bolt 1 and also its angular extension may be brought over the outer face of the nut and the lip brought to engage with the side of the nut, thus latching the locking member in unlocking position and permitting the separation of the nut and bolt.

It is, of course, to be understood that the bolt may be provided with any number of grooves so that the nut may be locked upon the bolt when screwed to any desired position or distance upon the said bolt.

When the substantially U-shaped spring lock is in locking position, the lip 8 thereof being arranged between the side walls of the depression 9 in the outer face of the nut assists the said locking member in resisting the strain to which it might be subjected by the tendency of the nut working loose on the bolt, incident to the vibration of the structure connected by the nut and bolt.

Having thus described the invention, what I claim is:

In a nut lock, the combination with a grooved bolt and a nut screwed on said bolt, said nut having a longitudinal groove extending through the bore thereof and having transverse depressions upon its opposite faces communicating with the said groove, and the depression upon the outer face of the nut communicating with the perimeter of the said nut, a substantially U-shaped spring lock, one of the arms of which being of a less length than the other arm and the connecting member between the arms being arranged angularly with respect to said arms, the shorter arm being received in the smaller depression in the inner face of the nut to position the body of the locking member in the longitudinal groove of the nut, the longer arm being received in the longer depression in the outer face of the nut and having its end formed with an inturned lip designed to frictionally engage with the perimeter of the nut when the locking member is in unlocking position and designed to be received between the walls of the said longer depression in the outer face of the nut when the lip is released from the perimeter of the nut and the body thereof sprung to engage in the groove in the bolt.

In testimony whereof I affix my signature.

WILLIAM V. TABER.

Copies of this patent may be obtained for five cents each, by addressing the "Commissioner of Patents, Washington, D. C."